(12) United States Patent
Jaudouin et al.

(10) Patent No.: US 6,767,029 B2
(45) Date of Patent: Jul. 27, 2004

(54) RUNNER FOR A VEHICLE SEAT AND A SYSTEM FOR A VEHICLE INCLUDING A SEAT EQUIPPED WITH SUCH A RUNNER

(75) Inventors: Paul Jaudouin, Georges des Groseilliers (FR); Daniel De Coninck, Flers (FR)

(73) Assignee: Faurecia Sieges d'Automobile S.A., Boulogne (FR)

( * ) Notice: Subject to any disclaimer, the term of this patent is extended or adjusted under 35 U.S.C. 154(b) by 459 days.

(21) Appl. No.: 10/042,044

(22) Filed: Oct. 19, 2001

(65) Prior Publication Data

US 2002/0109063 A1 Aug. 15, 2002

(30) Foreign Application Priority Data

Oct. 19, 2000 (FR) .......................................... 00 13388

(51) Int. Cl.⁷ .......................... B60R 21/36; B60R 21/32
(52) U.S. Cl. .................... 280/735; 297/344.1; 248/429; 248/430; 296/65.13
(58) Field of Search ...................... 297/344.1; 280/735; 248/429, 430; 296/65.13, 65.14, 68.1

(56) References Cited

U.S. PATENT DOCUMENTS

| | | | | |
|---|---|---|---|---|
| 5,803,491 | A | | 9/1998 | Barnes et al. ................ 280/735 |
| 6,053,529 | A | | 4/2000 | Frusti et al. ................. 280/735 |
| 6,095,555 | A | | 8/2000 | Becker et al. .............. 280/735 |
| 6,571,647 | B1 | * | 6/2003 | Aoki et al. .................. 280/735 |
| 6,617,531 | B1 | * | 9/2003 | Aoki ........................... 280/735 |

* cited by examiner

*Primary Examiner*—Anthony D. Barfield
(74) *Attorney, Agent, or Firm*—McCracken & Frank LLP

(57) ABSTRACT

A runner for a vehicle seat, comprising a male bar and a female bar that are mounted to move relative to each other over a predetermined stroke, the runner further comprising a detector disposed on one of the male and female bars, and a detectable member disposed on the other of the male and female bars. The male bar is a generally channel section bar including a horizontal web, the female bar is a generally channel section bar including a horizontal web, and the detectable member is formed by a tab that is integral with or secured to the edge of one of the lips of the male bar, the corresponding side wall of the second bar having an opening disposed in correspondence with the detector adapted to detect the presence or the absence of the tab of the male bar.

13 Claims, 5 Drawing Sheets

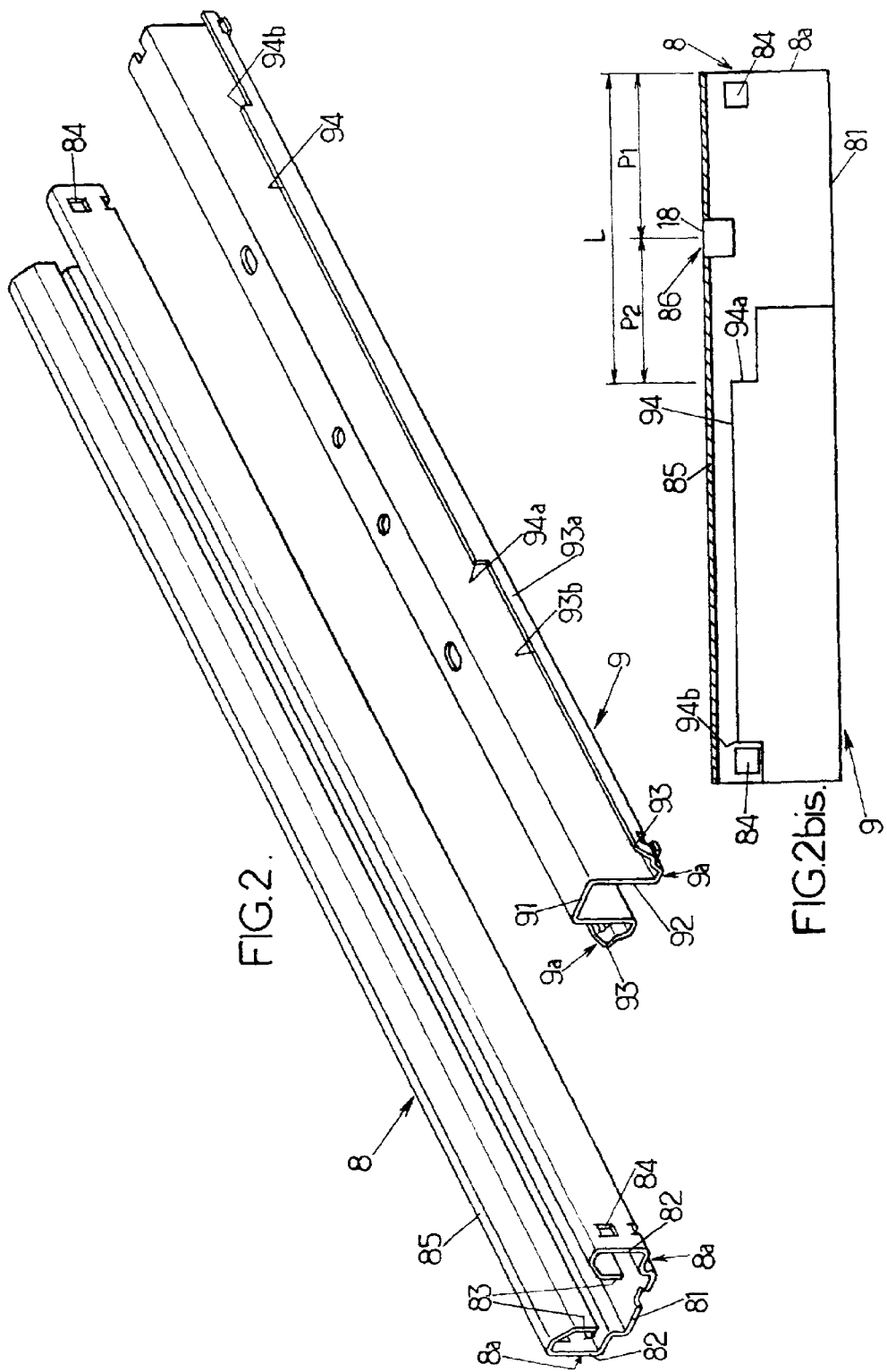

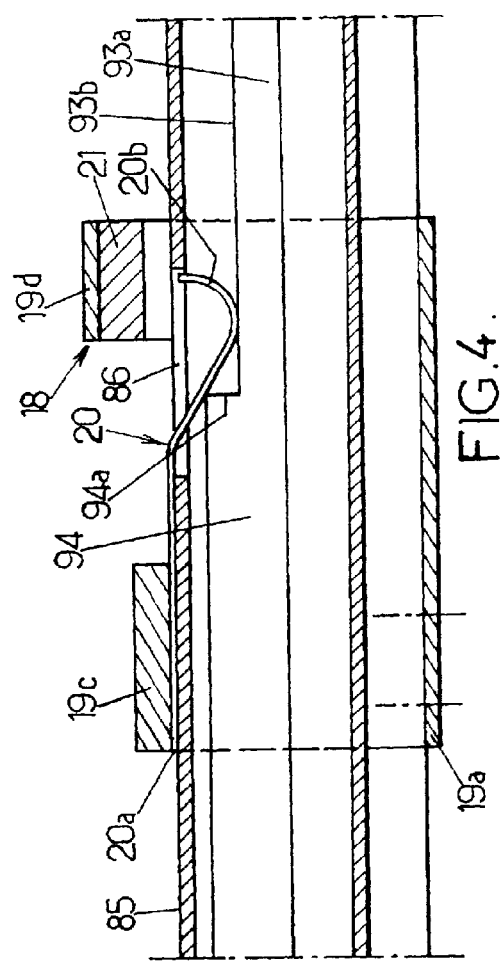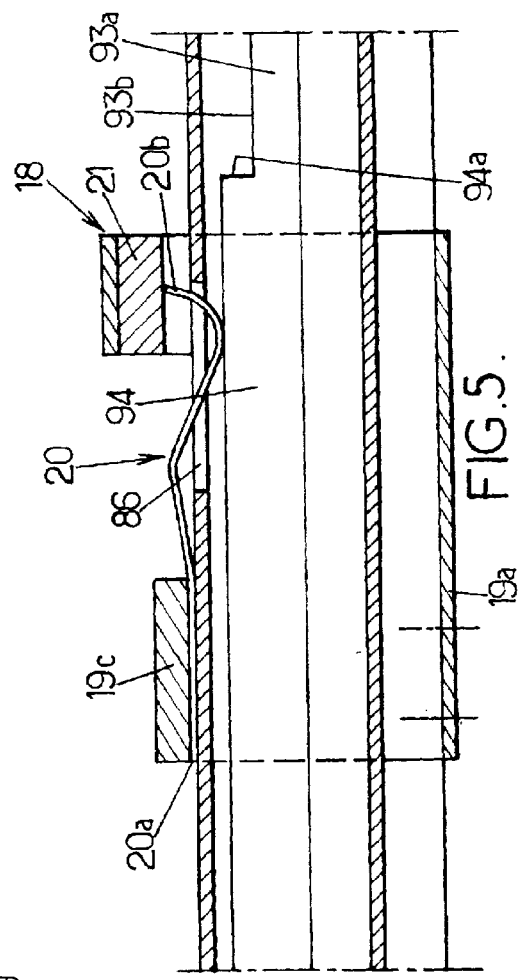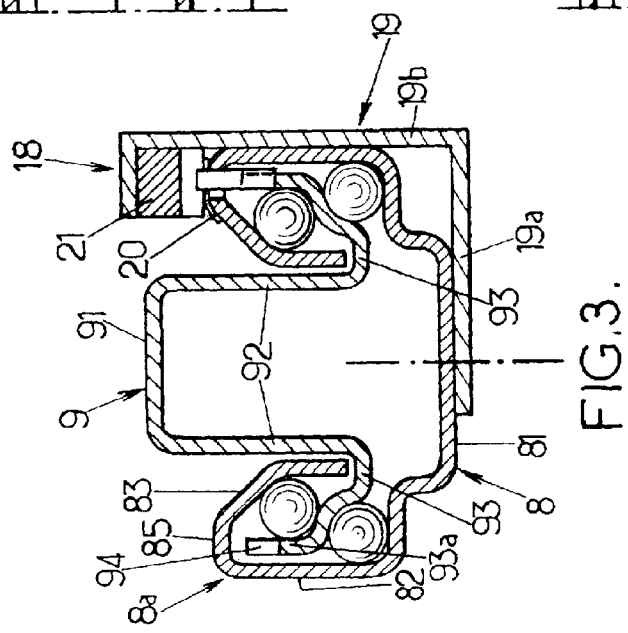

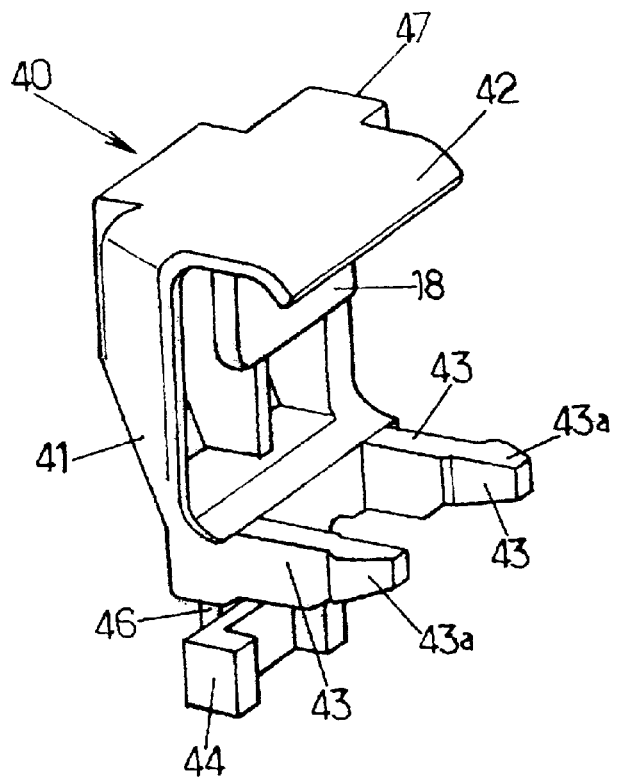
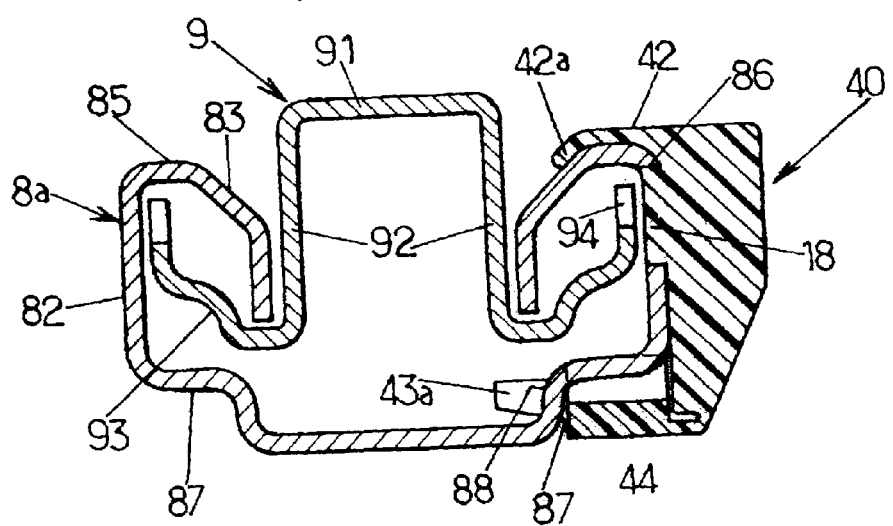

RUNNER FOR A VEHICLE SEAT AND A SYSTEM FOR A VEHICLE INCLUDING A SEAT EQUIPPED WITH SUCH A RUNNER

The present invention relates to a runner for a vehicle seat, and to a system for a vehicle including a seat equipped with such a runner.

More particularly, the invention relates to a runner comprising a male bar and a female bar that are mounted to move relative to each other over a predetermined stroke, the runner further comprising a detector disposed on one of the male and female bars, and a detectable member disposed on the other of the male and female bars, the detector being adapted to detect the presence of the detectable member while said detectable member is situated in a first fraction of said stroke and the absence of said detectable member while said detectable member is situated in a second fraction of the stroke, the first and second fractions together defining the entire stroke of the male and female bars relative to each other.

Such runners, as equipped with detectors and detectable members, are known, in particular, from U.S. Pat. No. 6,053,529 and U.S. Pat. No. 6,095,555. In such runners, the detector and/or the detectable member are situated outside the male and female bars, so that the detection zone in which the detector is to detect whether or not the detectable element is present is accessible from the outside of the runner. It can be understood that the accidental presence of any objects such as coins or chippings within the detection zone of the detector can cause accidental detection which does not correspond to the exact relative position of the male and female bars.

Since the detection performed is taken into account in the relationships for controlling various actuator devices, such as for the vehicle suspension, for air conditioning or for triggering airbags, it can be understood that accidental and erroneous detection leads to erroneous control of the actuator devices.

A particular object of the present invention is to mitigate those drawbacks.

To this end, according to the invention, a vehicle seat runner of the type in question is characterized in that: the male bar is a generally channel section bar comprising a horizontal web from which two substantially vertical side flanges extend that are extended outwards by lips, each lip being provided with an edge; in that the female bar is a generally channel section bar comprising a horizontal web from which two side walls extend, each of which is formed by a substantially vertical flange which is extended by a flange lip extending inwards and down towards the web of said female bar, the lips of the male bar being received between the vertical flanges and the lips of the female bar, and the lips of the female bar being received between the vertical flanges and the lips of the male bar; in that the detectable member is formed by a tab that is integral with or secured to the edge of one of the lips of the male bar; and in that the corresponding side wall of the second bar has an opening disposed in correspondence with the detector adapted to detect the presence or the of the tab of the male bar.

By means of these provisions, the detectable member, formed by the tab of the male bar, is received directly in a protected space formed by the vertical flange and the lip of the corresponding side wall of the female bar, and the presence of the opening in said side wall of the female bar makes it possible to position the detector so that its detection zone faces towards the protected space formed by the vertical flange and by the lip of the side wall of said female bar.

In preferred embodiments of the invention, it is possible, optionally, to make use of one or more of the following provisions:

at least part of the detector is disposed in the opening in the side wall of the female bar;

the tab extends longitudinally between two ends, and the corresponding side wall of the second bar, which wall is provided with the opening, extends between two ends, each of which is provided with an abutment element serving to co-operate with the ends of the tab to define said predetermined stroke over which the male and female bars move relative to each other.

the detector comprises:
firstly an elastically-deformable member having a first end secured to the side wall of the female bar, and a free second end disposed in the opening of the female bar and in the vicinity of the edge of the male bar, the tab of the male bar being disposed to move said free end by deforming the elastically-deformable member when said tab is facing the detector; and
secondly, a sensor suitable for detecting deformation of the elastically-deformable member when the tab of the male bar moves the free end of said elastically-deformable member;

the sensor is mounted on a support member that is fixed removably to the side wall of the female bar, said sensor being disposed facing the opening of the female bar;

the detector comprises:
firstly, a pivotally-mounted element having one end mounted to pivot on a separate support member mounted on the female bar, and a free end disposed in the opening in the female bar and in the vicinity of the edge of the male bar, the tab of the male bar being disposed to cause the free end of the pivotally-mounted element to pivot when said tab is facing the detector; and
secondly, a sensor mounted on the support member, the sensor being suitable for detecting pivoting of the pivotally-mounted element;

the detector comprises:
at least one magnetic member and excitation means for generating a magnetic field in said magnetic member, said magnetic member and the excitation means being received, at least in part, in the opening in the female bar, so as to co-operate with the tab to define a magnetic circuit while said tab is present facing said magnetic member, said tab being made of a material that is also magnetic; and
a Hall-effect probe secured to the magnetic member, said probe being organized to deliver a signal at least when said tab is facing the magnetic member by closing the magnetic circuit;

the detector is fixed to a support member that is mounted on the side wall of the female bar by clipping;

the support member is a generally channel section member comprising:
an intermediate plate on which the detector is mounted by being received in the opening provided in the vertical flange of the female bar;
an end plate which extends from the intermediate plate and which has a shape complementary to the shape of the lip of said female bar; and
two clipping fingers which extend from the intermediate plate, the two clipping fingers being engaged in holes provided in a wedge zone situated between the web of the female bar, and the corresponding vertical flange of the female bar; and the support member further comprises a fold-over element which connected to the intermediate plate and which serves to be folded over between the two clipping fingers and against the wedge zone of the female bar, so as to lock the support member onto the female bar after the clipping fingers have been engaged in the corresponding holes.

The invention also provides a vehicle seat including a seat proper supported by at least one runner as defined above.

In addition, the invention also provides a system for a vehicle, said system being characterized in that it comprises:

a vehicle seat as defined above;

at least one actuator device having two operating modes; and a control device connected to the detector of the runner and suitable for causing the actuator device to operate selectively in one or other of its two operating modes depending on the position of the seat relative to the floor of the vehicle as detected by the detector of the runner.

According to an advantageous characteristic of the system for a vehicle, the actuator device is an airbag disposed to protect an occupant of the seat in the event of an accident, and the control device is adapted to inflate the airbag in the event of an accident.

Other characteristics and advantages of the invention appear from the following description of embodiments of it, given by way of non-limiting example, and with reference to the accompanying drawings.

IN THE DRAWINGS

FIG. 2 is a diagrammatic exploded perspective view of a male bar and a female bar of a runner;

FIG. 2b is is a diagrammatic longitudinal section view of a runner of the invention;

FIG. 3 is a cross-section view of the runner in a first embodiment;

FIGS. 4 and 5 are longitudinal section views of the runner of FIG. 3, shown in different relative positions;

FIG. 8 is a diagrammatic perspective view of a detector mounted on a support member designed to be clipped onto the runner; and FIG. 9 is a cross-section view of the runner in a fourth embodiment, the support member of FIG. 8 being mounted on the runner by clipping.

In the various figures, like references designate identical or similar elements.

FIG. 1 shows a motor vehicle 1 which includes seats 2, one of which is shown in FIG. 1, namely the driver's seat.

Figure 1:
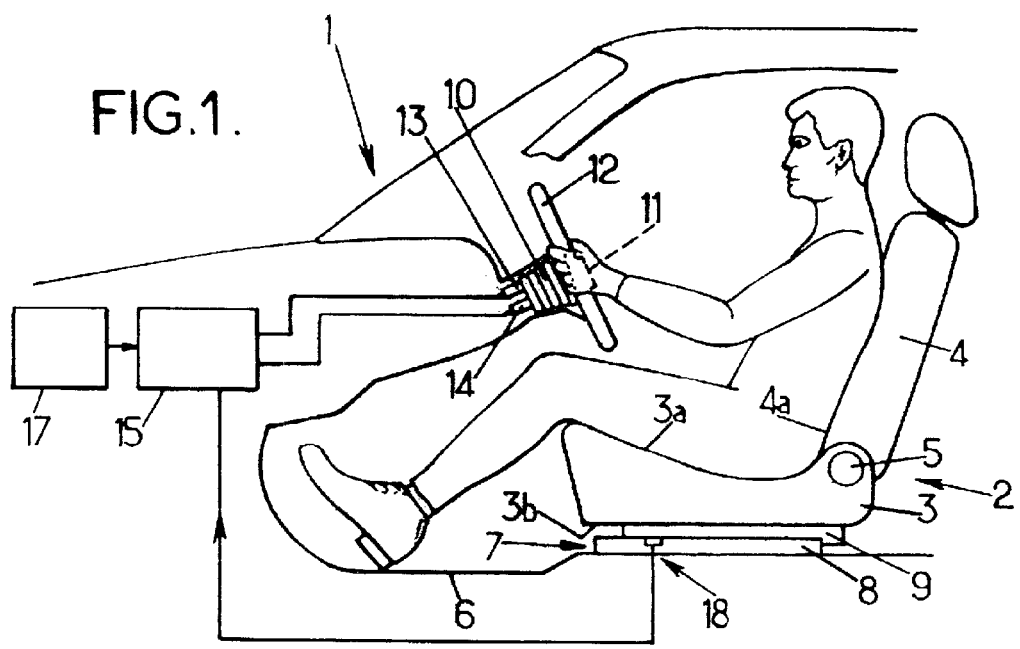
FIG. 1 is a diagrammatic view of a vehicle equipped with a system and a seat in an embodiment of the invention.

The seat 2 comprises a back 4 which has a bearing front surface 4a, and a seat proper 3 which extends longitudinally between a front end and a rear end. The rear end of the seat proper 3 is connected to the seat back 4 by means of a hinge 5 that makes it possible to vary the angle of inclination of the seat back 4 relative to the seat proper 3. The seat proper also has a bearing top surface 3a which, together with the bearing front surface 4a of the seat back defines a space for receiving the occupant of the seat. The seat proper also has a bottom surface 3b connected to the floor 6 of the vehicle by means of a system of runners 7, only one of which is shown in FIG. 1. The runner 7 comprises a female bar 8 fixed to the floor 6 of the vehicle, and a male bar 9 mounted to slide longitudinally in the female bar 8. The male bar 9 is designed to be displaced over a predetermined longitudinal stroke relative to the female bar 8. The male bar 9 is fixed directly to the bottom surface 3b of the seat proper 3 of the seat.

Thus, the runner 7 makes it possible to adjust the longitudinal position of the seat proper relative to the floor 6 of the vehicle.

To protect the occupant of the seat in the event of a road accident, the vehicle further includes one or more airbags, e.g. an airbag 10 disposed in the central portion 11 of the steering wheel 12 of the vehicle. This airbag 10 has two operating modes depending on which one of two explosive charges 13, 14 is fired, these explosive charges being suitable for generating different volumes of gas inside the airbag when it is deployed.

Which one of the two explosive charges 13 and 14 is fired by a control device 15 such as an electronic microcontroller is a function of:

information coming from an impact sensor 17, such as an accelerometer or the like; and information concerning a longitudinal position reached by the seat proper relative to the floor of the vehicle.

To this end, the runner 7 of the vehicle seat is equipped with a detector 18 which serves to be activated when the male bar 9 is situated within a certain fraction of its longitudinal stroke relative to the female bar 8. This detector 18 is connected by a wire or via any other suitable means to the control device 15 in order to deliver the necessary information once the seat 2 has reached a certain position relative to the floor 6 of the vehicle.

In the embodiment shown in FIG. 2, the female bar 8 is a generally channel section bar which comprises a horizontal web 81 from which two side walls 8a extend, each of which is formed by a vertical flange 82 that is extended by a flange lip 83 extending inwards and down towards the web 81 of said female bar. Each flange lip 83 and the vertical flange 82 associated therewith define a substantially horizontal portion 85. The male bar 9 is likewise a generally channel section bar which is upside down and which comprises a horizontal web 91 from which two side walls 9a extend, each of which is formed by a vertical flange 92, each vertical flange 92 being extended outwards by a lip 93. Each lip 93 of the male bar 9 is provided with an end portion 93a which extends substantially vertically and parallel to the vertical flanges 92, and each of these end portions is provided with an edge 93b which, over at least a longitudinal fraction, has an upstanding tab 94 that is formed integrally with the associated lip 93.

As can be seen in FIG. 3, when the male bar 9 is mounted inside the female bar 8, the lips 93 and tabs 94 of the male bar 9 are thus received in a protected space defined between the vertical flanges 82 and the lips 83 of the female bar 8, while the lips 83 of the female bar 8 are received between the vertical flanges 92 and the lips 93 of the male bar 9.

In order to allow the male bar 9 to move longitudinally in the female bar 8, same-diameter balls are disposed on either side of the lips 93 of the male bar 9, said balls being held in place in the recesses formed by the vertical flanges 82 of the female bar 8 and by their lips 83. Thus, each tab 94 extends longitudinally in the vicinity of a vertical wall 82 of the female bar 8.

As can be seen diagrammatically in FIG. 2*bis*, one of the side walls 8*a* of the female bar 8 is provided with an opening 86 which receives at least part of the detector 18 adapted to detect the presence or the absence of the corresponding tab 94 of the male bar 9.

Thus, in the same way as for the tab 94 of the male bar 9, the detection zone of the detector 18 is also situated directly in the protected space defined by the vertical flange 82 and by the lip 83 of the female bar, thereby making it possible to prevent an object such as a chipping or a coin from being present in the detection zone of said detector 18.

More exactly, the detector 18 is disposed on the fixed bar 8 so that it detects the presence of the tab 94 when the male bar 9 is situated in a first fraction $P_1$ of its entire stroke L, or the absence of said tab 94 when the male bar 9 is situated in a second fraction $P_2$.

As can be seen in FIG. 2*bis*, the fractions $P_1$ and $P_2$ together define the entire longitudinal stroke of the male bar 9 relative to the female bar 8.

In addition, each tab 94 thus extends longitudinally between a front end 94*a* and a rear end 94*b*, which ends define shoulders with the edges 93*b* of the end portions 93*a* of the lips on the male bar 9.

Each tab 94 also serves to co-operate with abutment elements 84 disposed on the female bar 8 when the runner 7 is assembled, i.e. when the male bar 9 is slidably mounted inside the female bar 8.

As can be seen more exactly in FIG. 2, the longitudinal ends of both of the vertical flanges 82 of the female bar 8 are provided with abutment elements 84 which serve to co-operate with respective ends 94*a* and 94*b* of the tab 94 so as to limit the movement of the male bar in the female bar to a predetermined stroke L (FIG. 2*bis*). These abutment elements 84 may in particular be formed by punching out the longitudinal ends of the vertical flanges 82 of the female bar 8, so that said abutment elements 84 are constituted by projecting elements that project into the recess defined by said flanges 82 and by the lips 83.

By means of this configuration, not only does the tab 94 of the male bar 9 serve to activate the detector 18 when the male bar 9 is situated in the first fraction $P_1$ of its entire stroke L, it also serves to limit the longitudinal stroke of said male bar 9 relative to the female bar 8.

In a first embodiment shown in FIGS. 3 to 5, the detector 18 mainly has an elastically-deformable member 20 and a sensor 21 suitable for detecting deformation of the elastically-deformable member 20.

The elastically-deformable member 20 is constituted by a blade which has firstly a first end 20*a* secured to the horizontal portion 85 of the side wall 8*a* of the female bar 8, and secondly a free end 20*b* which is engaged in the opening 86 provided in the horizontal portion 85 of the female bar 8. The free end 20*b* of the elastically-deformable member 20 is disposed in the vicinity of or in contact with the edge 93*b* of the lip 93 of the male bar 9, when the tab 94 is not facing the sensor 21 (FIG. 4).

The detector 18 is also provided with a support member 19 that comprises a bottom plate 19*a* disposed in contact with the web 81 of the female bar 8, and an intermediate plate 19*b* which is disposed in contact with the vertical flange 82 of the female bar 8. This intermediate plate 19*b* is provided with a longitudinal end portion 19*c* which is folded over onto the horizontal portion 85 of the female bar 8, thereby retaining the first end 20*a* of the elastically-deformable blade 20 on the female bar 8. The first end 20*a* of the blade 20 may be fixed to the portion 19*c* of the support member 19 before said support member is installed, e.g. by clipping onto the female bar 8. The intermediate plate 19*b* is also provided with a second longitudinal end portion 19*d* on which the sensor 21 is mounted. The free end portion 20*b* of the elastically deformable blade is disposed so as to be moved by one of the ends 94*a* of the tab 94 when said tab is facing the sensor 21 (FIG. 5). The blade 20 being moved or being deformed is thus detected by the sensor 21 which then delivers a signal which is sent directly to the control device 15 (FIG. 1).

For example, the sensor 21 may be constituted by a mechanical switch or by a reed switch, or by any other means suitable for being actuated by the resilient blade moving. Thus, it is also possible to consider having the sensor constituted by a piezoelectric element disposed on the middle portion of the blade situated between the stationary end 20*a* and the free end 20*b*. Thus when the tab 94 moves, the free end 20*b* of the blade moves substantially vertically, thereby deforming the middle portion of said blade, which makes it possible for the piezoelectric element to generate an electrical signal which is sent to the control device 15.

It can thus be understood that the length of the stroke fraction $P_1$ in which the presence of the tab 94 is detected is adjusted merely by positioning the opening 86 and thus detector 18 appropriately along the female bar 8.

When the sensor delivers a signal to the control device 15, the control device then determines which of the charges 13 or 14 it would trigger to deploy the airbag 10 if the sensor 17 detected an impact suffered by the vehicle.

Figure 6:
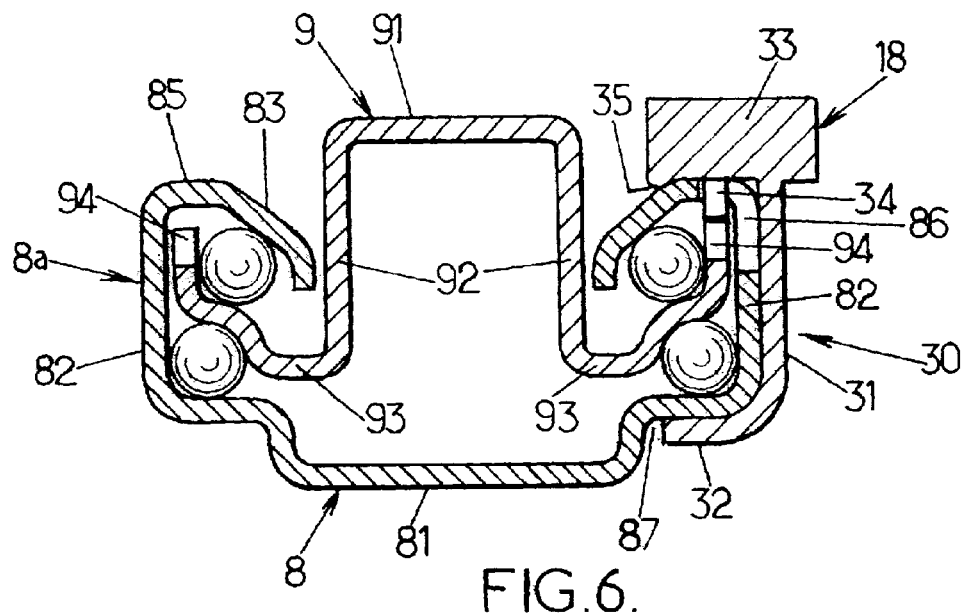
FIG. 6 is a cross-section view of a runner in a second embodiment.

FIG. 6 shows another embodiment of the runner 7 as equipped with a detector 18. The detector 18 is provided with an element 34 that is pivotally-mounted on a support member 30 which is clipped directly to the side wall 8*a* of the female bar. The pivotally-mounted element 34 is received in the opening 86 provided both in the horizontal portion 85 and in the vertical flange 82 of the female bar 8. The support member 30 includes a bottom portion 32 and a middle portion 31, both of which are in contact with the side wall 8*a* of the female bar 8. More particularly, the bottom portion 32 of the support member 30 is in contact with a wedge zone 87 situated between the web 81 and the vertical flange 82 of the side wall 8*a* of the female bar 8. The support member 30 also includes a top portion 33 disposed substantially on the horizontal portion 85 of the female bar 8. The top portion 33 of the support member is provided with a bottom edge 35 that projects and that serves to abut against the lip 83 so as to retain the support member when said support member is clipped onto the female bar 8 by its bottom portion 32 being put in contact against the wedge zone 87 of said female bar.

The pivotally-mounted element 34 has a free end disposed in the vicinity of the edge 93*b* of the male bar, so that, when the tab 94 is facing the detector 18, said tab causes the element 34 to pivot so as to activate a sensor received in the top portion 33 of the support element. For example, the sensor may be constituted by a mechanical switch or by a Hall-effect probe suitable for detecting the presence or absence of a portion of the pivotally-mounted element 34.

Figure 7:
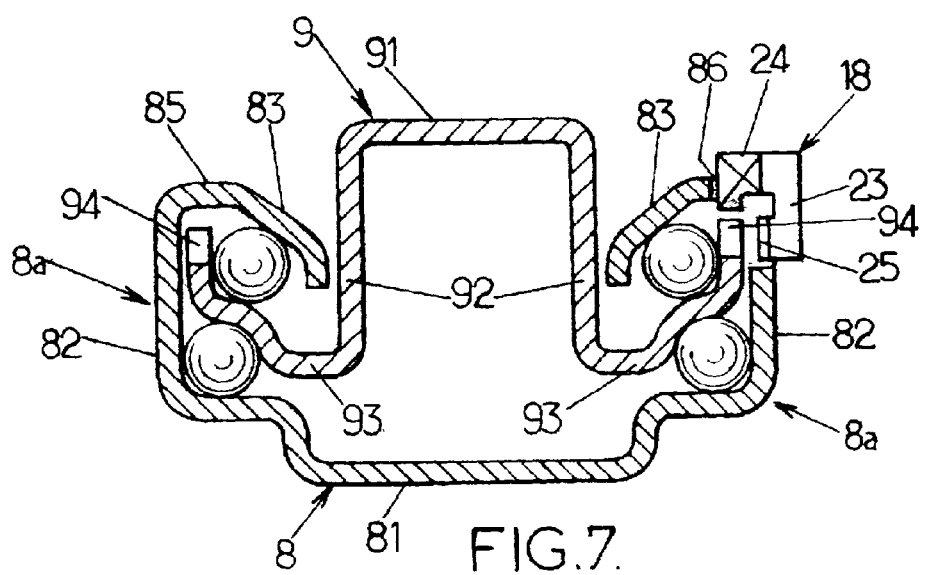
FIG. 7 is a cross-section view of a runner in a third embodiment.

As can be seen in FIG. 7 which shows another embodiment of the runner 7, the detector 18 is at disposed at least in part in an opening 86 provided both in the horizontal portion 85 and in the vertical flange 82 of the female bar 8. This detector 18 includes at least one magnetic member 23 that is secured to the female bar 8, and excitation means 24 for generating a magnetic field in said magnetic member 23 which is organized to co-operate with the tab 94 of the male bar 9 to define a magnetic circuit when said tab comes to face the magnetic member 23. The term "magnetic member"

is used herein to designate a member that is suitable for conducting a magnetic field that is applied to it by excitation means. For example, the magnetic member 23 may be made of a ferromagnetic material. Similarly, the tab 94 is also made of a magnetic materials. For example, the magnetic excitation means may be constituted by a permanent magnet 24 which thus delivers a magnetic field to the magnetic member 23 so that said magnetic member constitutes a magnetic circuit that is closed when said tab is disposed facing the detector 8. For example, the permanent magnet is disposed at one of the ends of the member 23. In order to detect the presence or absence of the tab, the detector 18 is provided with a Hall-effect probe 25 disposed at the other end of the magnetic member 23, this Hall-effect probe 25 being organized to deliver a signal to the control device 15 when the tab 94 of the male bar 9 closes said magnetic circuit. The detector 18 formed by the magnetic member 23 at the ends of which the permanent magnet 24 and the Hall-effect probe are fixed may be suitable for being mounted directly by clipping in the opening 86 in the female bar 8.

The embodiment shown in FIGS. 8 and 9 differs from the preceding embodiment shown in FIG. 7 in that the detector 18 is fixed directly to a support member 40 which is itself mounted on the side wall 8a of the female bar 8 by clipping. This support member 40 shown in FIG. 8 mainly comprises an intermediate plate 41 from which an end plate 42 and two clipping fingers 43 extend, on respective sides of said intermediate plate.

The support member 40 shown is thus a generally channel section member. The detector 18, which comprises the magnetic member, the excitation means, and the Hall-effect probe, is disposed on the intermediate plate 41, and more exactly on that face of the intermediate plate which serves to come into contact with the vertical flange 82 of the female bar.

To this end, the opening 86 is provided directly in the vertical flange 82 and said opening 86 has an outline having dimensions substantially complementary to those of the detector 18 in order to enable at least part of the detector 18 to be engaged in said opening 86. However, it is also possible to make provision for the detector 18 to be placed in correspondence with said opening 86 rather than it being received therein, it then still being possible for said detector to detect the presence or absence of the tab 94 of the male bar 9.

The end plate 42 shown has an end edge 42a that is slightly curved and that extends into the channel section to as to be in abutment against the horizontal portion 85 and the lip 83 of the female bar 8. The end edge 42a of the end plate 42 abutting against the lip 83 makes it possible to retain the support member 40 when its clipping fingers 43 are engaged reversibly in holes 88 provided in the side wall 8a of the female bar 8. The clipping fingers 43 are provided with clipping hooks 43a which engage in the holes 88 so as to fasten the support member 40 to the female bar 8.

These holes 88 are disposed in the wedge zone 87 situated between the web 81 and the vertical flange 82 of the side wall 8a of the female bar.

The support member 40 may also comprise a fold-over locking element 44 connected to the intermediate plate 41 by means of deformable tongues 46. The locking element 44 is folded over between the clipping fingers 43 and against the wedge zone 87 of the female bar in order to put the clipping hooks 43a in abutment against the outlines of the holes 88 in the female bar.

The support member 40 is also provided with a connector 47 serving to connect the control device 15 to the detector 18 by means of a wire. Thus, when the detector 18 is activated by the presence of the tab 94, or is deactivated by the absence of said tab, the control device 15 determines which one of the charges 13 or 14 it would trigger in order to deploy the airbag 10 if the sensor 17 detected an impact suffered by the vehicle.

What is claimed is:

1. A runner for a vehicle seat, the runner comprising a male bar and a female bar that are mounted to move relative to each other over a predetermined stroke, the runner further comprising a detector disposed on one of the male and female bars, and a detectable member disposed on the other of the male and female bars, the detector being adapted to detect the presence of the detectable member while said detectable member is situated in a first fraction of said stroke and the absence of said detectable member while said detectable member is situated in a second fraction of the stroke, the first and second fractions together defining the entire stroke of the male and female bars relative to each other, said runner being characterized in that:
the male bar is a generally channel section bar comprising a horizontal web from which two substantially vertical side flanges extend that are extended outwards by lips, each lip being provided with an edge;
the female bar is a generally channel section bar comprising a horizontal web from which two side walls extend, each of which is formed by a substantially vertical flange which is extended by a flange lip extending inwards and down towards the web of said female bar, the lips of the male bar being received between the vertical flanges and the lips of the female bar, and the lips of the female bar being received between the vertical flanges and the lips of the male bar;
the detectable member is formed by a tab that is integral with or secured to the edge of one of the lips of the male bar; and
the corresponding side wall of the female bar has an opening disposed in correspondence with the detector adapted to detect the presence or the absence of the tab of the male bar.

2. A runner according to claim 1, in which at least part of the detector is disposed in the opening in the side wall of the female bar.

3. A runner according to claim 1, in which the tab extends longitudinally between two ends, and the corresponding side wall of the female bar, which wall is provided with the opening, extends between two ends, each of which is provided with an abutment element serving to co-operate with the ends of the tab to define said predetermined stroke over which the male and female bars move relative to each other.

4. A device according to claim 1, in which the detector comprises:
firstly an elastically-deformable member having a first end secured to the side wall of the female bar, and a free second end disposed in the opening of the female bar and in the vicinity of the edge of the male bar, the tab of the male bar being disposed to move said free end by deforming the elastically-deformable member when said tab is facing the detector; and
secondly, a sensor suitable for detecting deformation of the elastically-deformable member when the tab of the male bar moves the free end of said elastically-deformable member.

5. A runner according to claim 4, in which the sensor is mounted on a support member that is fixed removably to the side wall of the female bar, said sensor being disposed facing the opening of the female bar.

6. A runner according to claim 1, in which the detector comprises:
- firstly, a pivotally-mounted element having one end mounted to pivot on a separate support member mounted on the female bar, and a free end disposed in the opening in the female bar and in the vicinity of the edge of the male bar, the tab of the male bar being disposed to cause the free end of the pivotally-mounted element to pivot when said tab is facing the detector; and
- secondly, a sensor mounted on the support member, the sensor being suitable for detecting pivoting of the pivotally-mounted element.

7. A runner according to claim 1, in which the detector comprises:
- at least one magnetic member and excitation means for generating a magnetic field in said magnetic member, said magnetic member and the excitation means being received, at least in part, in the opening in the female bar, so as to co-operate with the tab to define a magnetic circuit while said tab is present facing said magnetic member, said tab being made of a material that is also magnetic; and
- a Hall-effect probe secured to the magnetic member, said probe being organized to deliver a signal at least when said tab is facing the magnetic member by closing the magnetic circuit.

8. A runner according to claim 7, in which the detector is fixed to a support member that is mounted on the side wall of the female bar by clipping.

9. A runner according to claim 8, in which the support member is a generally channel section member comprising:
- an intermediate plate on which the detector is mounted by being received in the opening provided in the vertical flange of the female bar;
- an end plate which extends from the intermediate plate and which has a shape complementary to the shape of the lip of said female bar; and
- two clipping fingers which extend from the intermediate plate, the two clipping fingers being engaged in holes provided in a wedge zone situated between the web of the female bar, and the corresponding vertical flange of the female bar.

10. A runner according to claim 9, in which the support member further comprises a fold-over element which connected to the intermediate plate and which serves to be folded over between the two clipping fingers and against the wedge zone of the female bar, so as to lock the support member onto the female bar after the clipping fingers have been engaged in the corresponding holes.

11. A vehicle seat including a seat proper supported by at least one runner according to claim 2.

12. A system for a vehicle, said system being characterized in that it comprises:
- a vehicle seat according to claim 11;
- at least one actuator device having two operating modes; and
- a control device connected to the detector of the runner and suitable for causing the actuator device to operate selectively in one or other of its two operating modes depending on the position of the seat relative to the floor of the vehicle as detected by the detector of the runner.

13. A system according to claim 12, in which the actuator device is an airbag disposed to protect an occupant of the seat in the event of an accident, and the control device is adapted to inflate the airbag in the event of an accident.

* * * * *